United States Patent

[11] 3,583,368

| [72] | Inventors | William J. Mandelbaum<br>1007 S. End St., Woodmere, N.Y. 11598;<br>Morton Colby, 789 Waring Ave., Bronx,<br>N.Y. 10467 |
|---|---|---|
| [21] | Appl. No. | 860,915 |
| [22] | Filed | Sept. 25, 1969 |
| [45] | Patented | June 8, 1971 |

[54] MOBILE ANIMAL GROOMING SALON
10 Claims, 3 Drawing Figs.

[52] U.S. Cl. ................................................ 119/158,
119/1, 119/83, 296/24
[51] Int. Cl. ........................................................ A01k 13/00,
A01k 29/00
[50] Field of Search ............................................ 119/158, 1,
83; 296/23 MC, 24 C

[56] References Cited
UNITED STATES PATENTS

| 2,267,509 | 12/1941 | Strong | 296/24 |
| 2,661,865 | 12/1953 | Wendt | 119/158X |
| 2,677,571 | 5/1954 | Williams | 296/24 |
| 3,023,734 | 3/1962 | Schaub | 119/158X |

*Primary Examiner*—Hugh R. Chamblee
*Attorney*—Kirschstein, Kirschstein, Ottinger & Frank ABSTRACT: A mobile animal grooming salon, the interior of which is provided with an animal bathing station and a drying station in close proximity thereto. A grooming station adjacent to the drying station and being provided with a heat producing apparatus for blowing heated air into the drying station. The mobile salon having inner sidewalls upon which are mounted racks of cleaning and grooming solutions in close proximity to the animal bathing station and grooming instruments mounted on one of said inner sidewalls in close proximity to the grooming station to permit the groomer to wash, dry, fluff, cut and groom the animal in one continuous sequential operation.

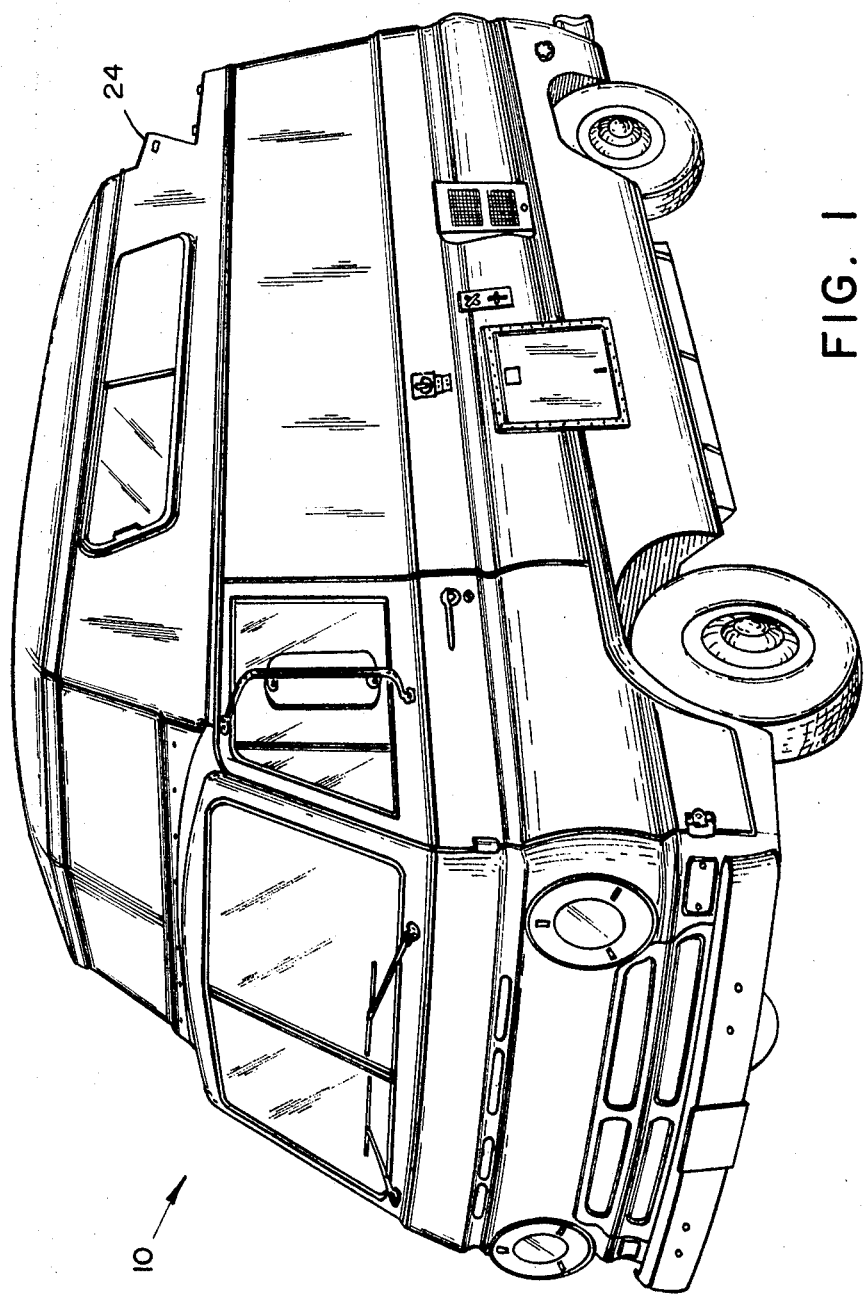
FIG. I
INVENTORS
WILLIAM J. MANDELBAUM
MORTON COLBY
BY
Kirschstein, Kirschstein, Ottinger & Frank
ATTORNEYS

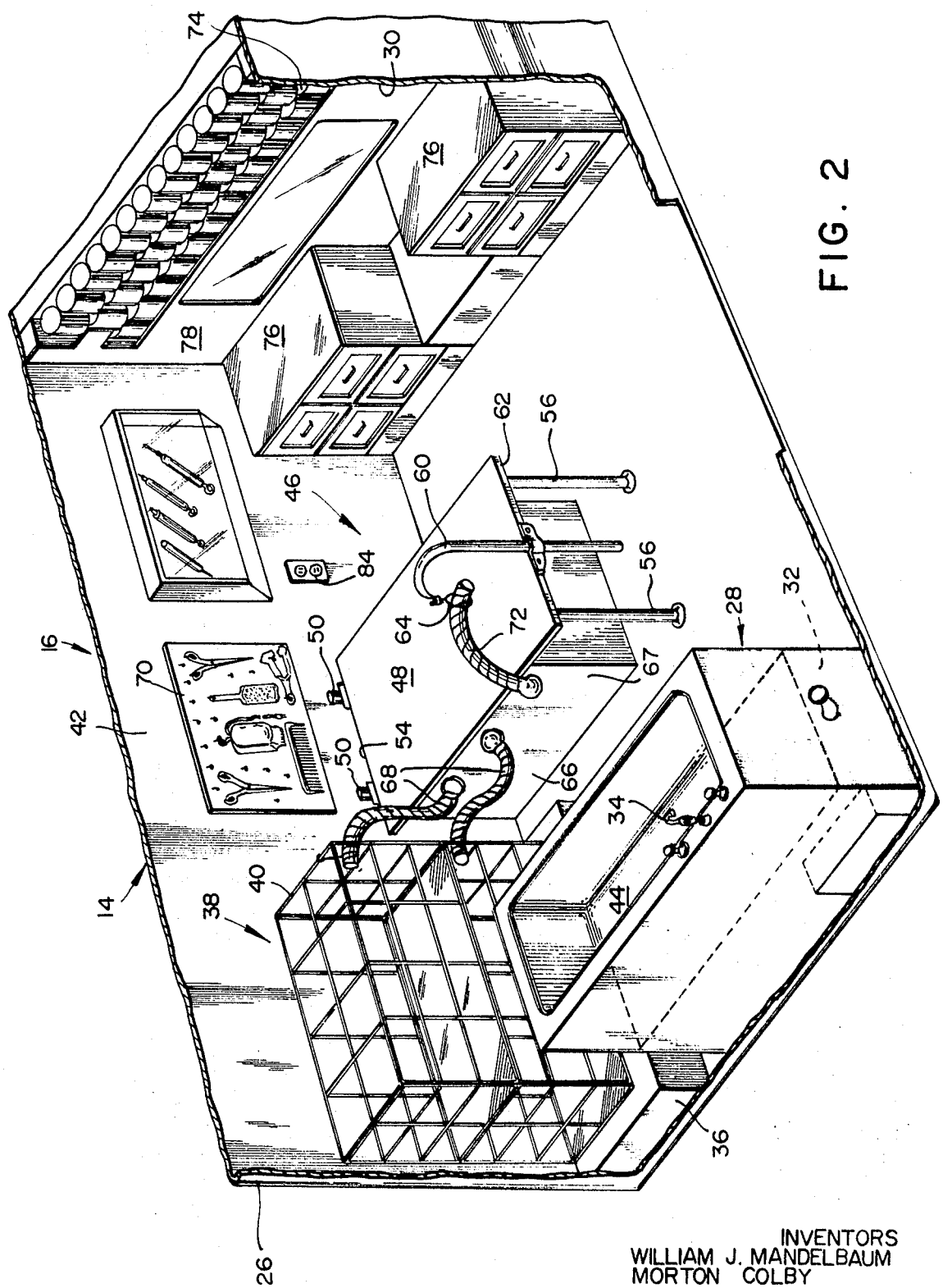

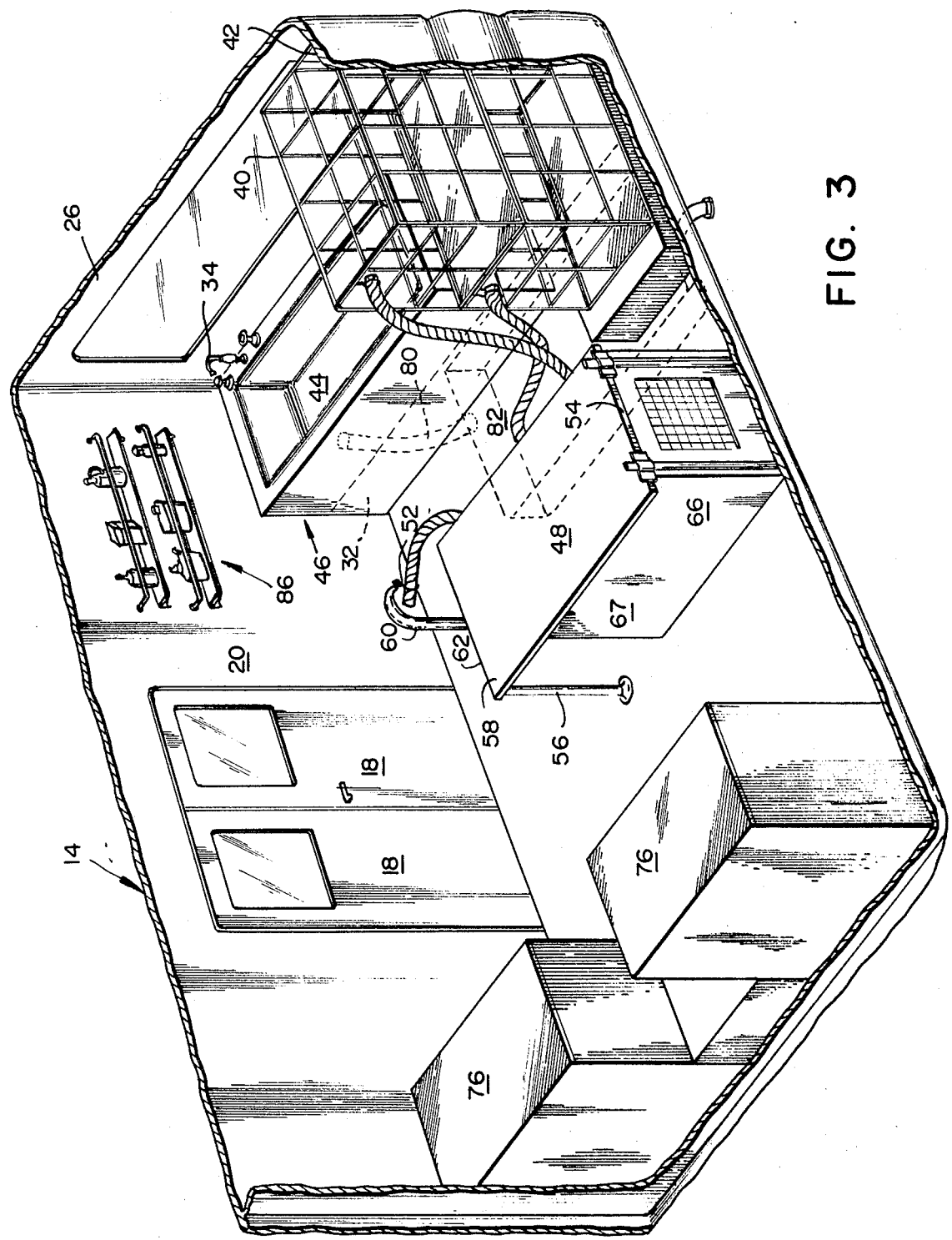

3,583,368

MOBILE ANIMAL GROOMING SALON

BACKGROUND OF THE INVENTION

1. Field of the Invention

The present invention relates to a mobile animal grooming salon and more particularly to a plurality of animal grooming stations within a confined area.

2. Description of the Prior Art

With the emergence throughout the United States of the popularity of keeping pets, the problems of maintaining the respective animals in good health and well-groomed condition have been compounded. The ordinary pet owner viewed with dismay the irregularly scheduled visits to have their respective pets cleaned and groomed by professionals. It became quite burdensome to periodically take the animal to and from the place where the grooming services were provided since they generally were remote from the areas in which the pet owners lived.

With the increase in popularity of long-haired and diversely stylized pets, great demand has been created for a more personalized attention within the confines of the pet owner's home or in close proximity thereto.

We have felt it necessary to permit the grooming services to be delivered to the pet owner rather than place the burden upon the owner to transfer the pets to distantly located salons in order to groom the cherished animals. Efficiency and compactness require that a mobile van be designed to provide all the necessary grooming aspects for providing the same services which can be achieved at a veterinary hospital.

SUMMARY OF THE INVENTION

It is the general object of the present invention to avoid and overcome the foregoing and other difficulties of prior art devices by providing a mobile grooming salon which is compact and efficiently designed.

Another object of the present invention is to provide the placement of animal grooming equipment within a mobile unit to permit the sequential animal grooming services within a confined area.

Still another object of the present invention is to provide a functional relationship between various animal grooming apparatus to permit the groomer to wash, dry, fluff and cut the animal and stylize its coat.

The general objects, and other objects, which will be apparent as the description proceeds are achieved by providing a mobile animal grooming salon which interior comprises an animal washing station, a plurality of drying stations adjacent said animal washing station, a grooming station adjacent said plurality of drying stations, a hot air heater having a plurality of hoses directing heated air into said plurality of drying stations, a blower hose connected to said hot air apparatus and releasably connected to said grooming station, a cleaning and grooming salon rack connected to the interior wall adjacent said animal washing station, an instrument rack disposed on the interior wall for maintaining an operator's grooming instruments in close proximity to the grooming table and a power source for supplying the necessary electrical power for operating said heater and said instruments, thereby permitting the animal groomer to wash, dry and groom the animal within the confined interior of said animal grooming salon.

Other objects of the invention in part will be obvious and in part will be pointed out hereinafter.

The invention accordingly constitutes the features of construction, combinations of elements and arrangements of parts which will be exemplified in the mobile animal grooming salon hereinafter described and of which the scope of application will be indicated in the appended claims.

BRIEF DESCRIPTION OF THE DRAWINGS

For a better understanding of the present invention, reference should be had to the accompanying drawings wherein like numerals of reference indicate similar parts throughout the respective views and wherein;

FIG. 1 is a perspective view of the van;

FIG. 2 is a perspective view of the interior of the van; and

FIG. 3 is a perspective view of the van taken from the opposite side thereof.

DESCRIPTION OF THE PREFERRED EMBODIMENT

Referring now to FIG. 2 there is shown a van of the self-propelled type which is generally referred to by the reference numeral 10. The van 10 may be provided with a front section 12 containing space for a driver and passenger within which may be disposed the motor providing the motive force for driving the van 10, and the necessary steering equipment (not shown). A second section 14 is provided which houses the animal grooming salon 16 into which entry may be gained by a set of double doors 18 disposed in the right sidewall 20 of the van 10.

A third section 22 is provided in the rear end of the van 10 which is principally used for the storage and display of packaged animal foods which may be viewed by opening a set of double doors in the rear of the van 10.

As shown in FIG. 1 and air-conditioning unit 24 may be provided to cool the interior area of the animal grooming salon 16 which unit is operated by an electrical source in either the engine or a separate rechargeable battery supply (not shown). The outer configuration of the van 10 is generally of a well-known design; however, the interior of the second section 14 of the van 10 which houses the animal grooming salon 16 provides a novel, functional area permitting the disposition of various animal grooming devices to increase the efficiency of a grooming service provided within the van which is adapted to be brought directly to the consumer or pet owner's home. The interior of the grooming salon section 16 of the van is a self-contained unit which may depend upon its own source of electrical energy. The animal grooming salon area 16 is provided with a backwall 26 of plexiglass material against which a washing station or tub 28 is disposed and fits in part against the right inner sidewall 30 of the van 10. The washing station or tub may be of the standard height of a sink and is provided therewith in its lower portion a water storage tank 32 which contains water for the cleansing or bathing of the animal. A spout or faucet 34 is provided on the upper surface of the tub 28 to permit the dissemination of water against the animal to be cleansed. The tank is capable of retaining approximately 30 gallons of water and is refillable when the operator completes his daily route. A water heater may be provided to permit hot water to be generated. The heater may be of the gas or electrical type such that heat is readily available to warm the water flowing from the water storage tank 32 to the faucet 34. It should be particularly understood that the size of the water tank should not be interpreted as a limitation of varying size. Tanks of higher or lower capacity may be used in its place.

Disposed immediately to the right of the washing station 28 (looking toward the backwall 26) there may be provided a small pedestal 36 which is adapted to support a drying station 38. The drying station is comprised of a plurality of cages 40. It is essential to the invention that the dry station 38 is in close proximity to the washing station 28 since the moving of a wet animal can be extremely difficult and dangerous. The cages themselves are of a generally open work structure having one side foldable upward to permit the ingress and egress of the washed or dried animal. Each cage 40 is provided with a diffuser which is adapted to disseminate warm air into each cage 40 as will hereinafter be described in greater detail.

As shown in FIG. 2, the cages 40 abut the left inner sidewall 42 of the van 10 and the entrance to each of the cages are readily accessible to the operator without necessity of the operator carrying a wet animal any great distance. Efficiency of transfer of the animal from one station to another promotes the animal's confidence in the operator and permits the animal to be fully attended.

It should be noted that the basin 44 portion of the wash station 28 is an oversized unit so that it may accept animals of varying sizes.

In order to comfortably cut and groom the coat of an animal after the animal has been washed and dried, a grooming station 46 may be provided. The grooming station 46 comprises a grooming table 48 which may be mounted on the inner left sidewall 42 of the van directly in front of the plurality of cages 40 in which the animal's coat is dried. The grooming table 48 may be mounted such that the height thereof from the floor of the grooming salon may be adjustable between 27 inches and 42 inches. To this end, a pair of tubular legs 50 may be mounted against the inner left sidewall 42 of the van 10 which are adapted to engage a clipping means 52 disposed on the rear edge 54 of the grooming table 48. With this arrangement the rear edge of the grooming table 48 is permitted to slide up and down along a vertical axis of the tubular member 50 and to be releasably clamped in a desired position. Similarly, the front legs 56 of the table 48 are adapted to be extensible and retractable to permit the table to be leveled at varying heights between 27inches and 42 inches from the floor. The upper surface 58 of the grooming table 48 may be provided with a nonskid material such as grooved rubber to prevent the animal from slipping from the table 48 while the operator is grooming the dog's coat.

In order to aid in holding the animal on the grooming table 48 a collar retaining means or bowed rod 60 is fastened to the front edge 62 thereof whose height may be varied in accordance with the size of the animal. At the end of the bowed rod 60 which bends toward the center of the table 48 is provided a collar holding element 64. The collar holding element 64 may comprise a short chain to which may be connected the collar of the animal being groomed; in this manner, the animal's head may be held in a relatively stable upward position while the operator is cutting and grooming the coat of the animal. The position of the collar holding element 64 is changeable with the height of the element itself so that if a small dog is being cut, the grooming table 64 may be raised the full 42 inches height and the collar retaining element may be lowered. Obviously, the height of the table is increased when the animal to be groomed is small so that the operator need not continually bend over in an uncomfortable position during the grooming operation.

In order to provide a means for drying the animal after it has been washed in the basin 44 of the washing station 28 a hot air blower or heater 66 is positioned beneath the grooming table 48 and is provided with a plurality of hoses 68. The heater 66 is provided with a blower 67 therein which delivers heated air through a hose 68 to each of the cages 40 positioned between the grooming station 46 and the washing station 28. In this manner, the operator after cleaning and washing the animal, places the animal, in its wet condition, inside one of the cages 40 and thereafter activates the heater 66 and blower 67 to promote the drying of the animals hair of its coat. At the conclusion of the drying operation, the animal may be removed from the cage 40 directly to the grooming table with little effort on the part of the operator and little, if any lost motion so that the grooming operation may be achieved. Here again, it must be observed that the positioning of the various stations are of utmost importance since the efficiency and quick handling of the animal in sequential grooming procedures not only promotes a favorable animal demeanor but further promotes the safety of the operator.

Disposed on the left inner wall 42 of the left side of the van 10 there may be provided an instrument holding means or peg board 70 from which may hang his various working instruments such as scissors, electric shears, comb, brush and other grooming instruments. The blower 67 of the heater 66 may be in communication with a third hose 72 which provides tepid air which is utilized by the operator during the grooming procedure to fluff the hair on the coat of the animal.

We have described to this point a combination of grooming elements, a washing station 28, a drying station 38, a grooming station 46 and a means for drying the pet but inherent in such combination is the disposition of the various elements which comprise the invention of the mobile grooming salon. The operator performs the grooming functions in a sequence of operations which promotes the good will of the animal itself in the efficient time of handling of the pet. There is no lost motion in washing the animal at the wash station 28 and immediately transferring the same to the drying station 38 or the cages 40 in which the pet is dried and from the drying station to the grooming table 48 where the grooming operation is commenced by the operator. The availability of each station promotes the most efficient sequence of operation, in grooming the animal and permit the expeditious handling of the pet to reduce the possibility of resistance by the animal through the various grooming stages.

Leading animal trainers indicate that fast and sure-handling handling of animals promotes the confidence of animals and permits the trainer or operator to perform functions which an animal may ordinarily find displeasurable. Our invention permits the expeditious and efficient handling of the animal through its various grooming steps by providing a functional relationship between the various grooming stations to permit the sure handed and most expeditious handling of the animal.

Above the washing station 38 or tub on the left inner sidewall 42 of the van 10 there is provided a rack 74 which accommodates all the washing solutions necessary to cleanse the coat of an infinite variety of animals to be groomed. During the washing operation, the operator need only reach to his left to choose the proper grooming or washing solution for the washing operation. Here again, the disposition of the rack 74 relative to the washing station 28 is of utmost importance since the availability of the cleaning solutions during the washing of the animal in the basin promotes the expeditious handling of the animal to lessen the time of inconvenience and thereby promote the well-being of the animal being washed.

Structurally, the interior of the animal grooming salon is provided with a plurality of cabinets 76 mounted against the front wall 78 of the salon to permit the storage of utensils most commonly used by the operator. The storage areas and other locations relative to the sequential grooming operation provides the operator with readily accessible replacement parts, again to promote the expeditious sequential grooming operation.

The basin 44 may be connected by a waste conduit 80 to a waste tank 82 mounted beneath the floor of the salon area of the van 10 so that the used water, accumulated during the course of the cleaning of an animal, is stored in the waste tank for later discarding, rather than discarding the used fluid in the area of the home of the pet being groomed. It may be seen that the vehicular grooming salon is a self-contained unit and does not rely upon outside sources of either water or electricity. The electrical energy may be supplied by continuously running the engine of the van 10 to promote the sufficient electrical energy for the operation of the air-conditioning units, the lights disposed within the salon area as well as any electrical outlets 84 near the grooming table 48 for operating the necessary implements for grooming of the animal.

As shown in FIG. 2 a rack 86 may be provided against the front wall 78 of the salon area 12 which is adapted to display varying products for the beneficial use of the animal owners. As previously mentioned, the rear section of the mobile unit is provided with a food display area (not shown) which is adapted to contain a multiplicity of products which are visible to the animal owner for selecting varying products for the beneficial use of the animal.

In operation, our invention permits the washing of an animal in the basin 44 of the washing station 28 at the right rear portion of the salon area 12 in juxtaposition to a rack 74 of animal cleaning fluids. Immediately adjacent to the wash station basin 44 there is provided a plurality of cages 40 for housing animals to be dried by hot air being delivered to those cages 40 from a remote heater 66 disposed beneath the grooming table 48. The deliverance of the hot air promotes the drying of the animal's coat so that upon completion of the drying, the animal may be removed from its cage 40 and immediately positioned upon the grooming table 48 so that the operator may perform the necessary grooming operations. Ordinarily, the grooming procedure comprises the varying steps of washing the animal, drying the animal and cutting the animal's hair, fluffing the hair on the coat and thereafter styling the coat and applying the necessary grooming liquids to beautify the animal and promote the general well-being.

It will be seen by those skilled in the art that our invention promotes the functional relationship between animal grooming devices and their relative disposition within a mobile van to permit an animal grooming procedure so that expeditious handling of the animal will promote healthy and happy well-groomed pets and remove from the owners of the pet the task of continuously transporting the pet to remote pet groomers.

Wherefore in accordance with the patent statutes a preferred embodiment has been described and shown in detail, it should be particularly understood that the invention is not limited thereto or thereby.

Having thus described the present invention, we claim as new and desired to be secured by Letters Patent:

1. A mobil animal grooming salon comprising an animal washing station, a drying station disposed immediately adjacent said washing station, racks positioned above said washing station containing animal's cleaning fluids for ready availability of the operator, a heater in communication with said drying station for providing warm air to dry the coat of an animal placed within said drying station, a grooming station position adjacent said animal drying station to receive the animal to be groomed and a tool carrying rack disposed above said grooming table permitting the ready access of the operator to the instruments necessary to groom said animal, said station positioning permitting the washing, drying and grooming of the animal in an expeditious manner.

2. A mobile animal grooming salon according to claim 1 wherein said wash station is comprised of a sink, said sink having a basin therein for placing the animal while it is being washed, a water tank disposed beneath said sink for storing water therein to be dispensed against the coat of the animal to be cleaned and a waste conduit for disposing of the fluid used to cleanse the washed animal.

3. A mobile grooming salon according to claim 2 wherein said drying station comprises a plurality of cages, a heating element disposed beneath said grooming station and in communication with said cages for delivering warm air thereto for drying the coat of the animal, each of said cages being provided with an ingress and egress adjacent said washing station permitting the ready access and removal of the washed animal to said cages.

4. A mobile animal grooming salon according to claim 3 wherein said grooming station comprises a grooming table, said grooming table being provided with nonslip upper surface and a collar holding element releasably connected to said grooming table for holding the collar of the animal to be groomed.

5. A mobile animal grooming salon according to claim 4 wherein said heaters are connected to said plurality of cages by flexible hose connections, said heaters having a blower therein, said blower having a flexible hose for delivering tepid air to the grooming table for performing the fluffing operation of an animal's coat.

6. A mobile animal grooming salon according to claim 5 wherein said grooming table is varyingly fixed in position in accordance with the size of the animal to be groomed, said collar holding means adapted to releasably secure the collar of the animal to maintain the animal's head in a relatively fixed position for trimming of the coat of the animal by the operator.

7. A mobile animal grooming salon according to claim 6 wherein a water storage tank is disposed beneath the floor of the salon to store the contaminant fluid created during the washing of the animal, said storage tank being provided with a valve arrangement for discarding said waste fluid.

8. A mobile animal grooming salon according to claim 7 wherein said salon is provided with its own source of electrical energy to permit the operation of varying electrical units without necessitating the acquisition of outside energy sources.

9. A mobile animal grooming salon according to claim 8 wherein said salon is positioned in a van having a front section and a rear section, said salon being disposed between said front and rear sections.

10. A mobile animal grooming salon according to claim 1 wherein said salon is positioned in a van having a front section and a rear section, said salon being disposed between said front and rear sections.